US007859690B2

(12) United States Patent
Sakabe

(10) Patent No.: US 7,859,690 B2
(45) Date of Patent: Dec. 28, 2010

(54) IMAGE FORMING APPARATUS HAVING PROOF COPY FUNCTION

(75) Inventor: Tomokazu Sakabe, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1411 days.

(21) Appl. No.: 11/305,518

(22) Filed: Dec. 15, 2005

(65) Prior Publication Data

US 2007/0139682 A1    Jun. 21, 2007

(51) Int. Cl.
*G06F 3/12* (2006.01)
(52) U.S. Cl. ............... 358/1.13; 358/1.1; 358/505; 358/474; 358/1.14; 702/122; 399/15; 399/81
(58) Field of Classification Search ............... 399/15, 399/85, 80, 81; 358/1.13, 1.14, 1.12, 1.15, 358/505, 474, 1.1; 702/137, 122
See application file for complete search history.

(56) References Cited

U.S. PATENT DOCUMENTS

| | | | | |
|---|---|---|---|---|
| 6,172,761 B1 * | 1/2001 | Ohtani | ............... | 358/1.12 |
| 6,263,296 B1 * | 7/2001 | Nakamura | ............... | 702/137 |
| 6,757,500 B2 * | 6/2004 | Kuboki | ............... | 399/15 |
| 6,833,925 B1 * | 12/2004 | Igoe et al. | ............... | 358/1.15 |
| 7,113,720 B2 * | 9/2006 | Hirano | ............... | 399/80 |
| 7,327,968 B2 * | 2/2008 | Hosoi | ............... | 399/81 |
| 7,437,262 B2 * | 10/2008 | Boose et al. | ............... | 702/122 |

FOREIGN PATENT DOCUMENTS

JP    2001-341361    12/2001

* cited by examiner

*Primary Examiner*—Edward L Coles
*Assistant Examiner*—Ashish K Thomas
(74) *Attorney, Agent, or Firm*—Patterson & Sheridan, LLP

(57) ABSTRACT

An image forming apparatus is provided which, upon receipt of an instruction to perform proof copying in a proof copy mode, stores a numeral value showing the number of times the instruction is made. The performing of the proof copying is restricted based on the numeral value showing the number of times stored and a numeral value showing a pre-set value for allowing the performing of the proof copying.

12 Claims, 7 Drawing Sheets

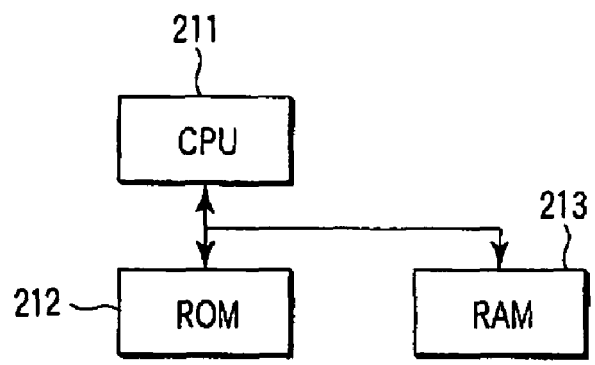
F I G. 5
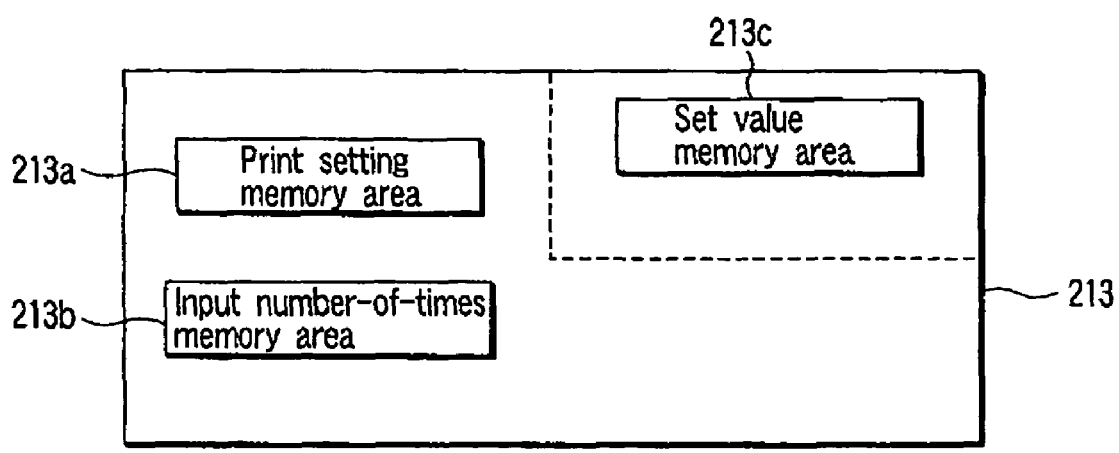
F I G. 6

IMAGE FORMING APPARATUS HAVING PROOF COPY FUNCTION

BACKGROUND OF THE INVENTION

1. Field of The Invention

The present invention relates to an image forming apparatus having a proof copying function.

2. Description of the Related Art

In digital copying machines, some have a proof copying function as will be set out below. When a proof copy button is depressed, the machine allows the read-out of an image and, after only one copy based on the read-out image has been output, once interrupts the image forming processing. Upon receipt of any setting change etc., relating to printing such as print copies or without such setting change from the user, a start button is depressed and, by doing so, any remaining copies corresponding to the read-out image are output either with the setting change or without such setting change.

By outputting only one copy after an image has been read out, the user can check the print copy for workmanship. Where the user prints a greater amount of copies, it is possible to prevent any error involved and it proves advantageous. Since, after outputting one copy, the digital copying machine is ready for the next output, it does not receive any job other than a high priority order interrupt job. If, therefore, the user frequently performs the setting changes and repeats output operations for only one copy, then sometimes no other user can use the digital copying machine.

Therefore, there is a growing need for an image forming apparatus which, even if it has a proof copying function, allows its use by any other user without a longer wait.

BRIEF SUMMARY OF THE INVENTION

In an aspect of the present invention there is provided an image forming apparatus comprising an image reading section configured to read out an image from a document and output its image data; an image data memory section configured to store the image data which is output from the image reading section; an image forming section configured to form an image on a sheet based on the image data which is output from the image data memory section; a memory section configured to store a print setting including a setting of print copies; a proof copy button configured to perform a proof copy mode for proof copying for allowing only one copy to be image formed by operating the image forming section based on the print setting stored in the memory section and image data stored in the image data memory section and, when this is done so, interrupt the image forming processing and, for copying any remaining copies included in the print setting to be image formed by operating the image forming section receiving an operation from the user; a set value memory section configured to store a set value for allowing the proof copying to be performed at an interrupted time of the proof copy mode; an input number-of-times storing section configured to store a numeral value showing the number of times the input is made on the proof copy button; and a control section configured to restrict the proof copying which is performed by an input operation on the proof copy button on the basis of a numeral value stored in the input number-of-times memory section and a numeral value set in the set value memory section.

Objects and advantages of the invention will become apparent from the description which follows, or may be learned by practice of the invention.

BRIEF DESCRIPTION OF THE SEVERAL VIEWS OF THE DRAWING

The accompanying drawings illustrate embodiments of the invention, and together with the general description given above and the detailed description given below, serve to explain the principles of the invention.

FIG. 5 is a block showing a main structure of a control section in the present embodiment;

FIG. 6 is a view for explaining information memory areas in a RAM in the present embodiment;

DETAILED DESCRIPTION OF THE INVENTION

Figure 1:
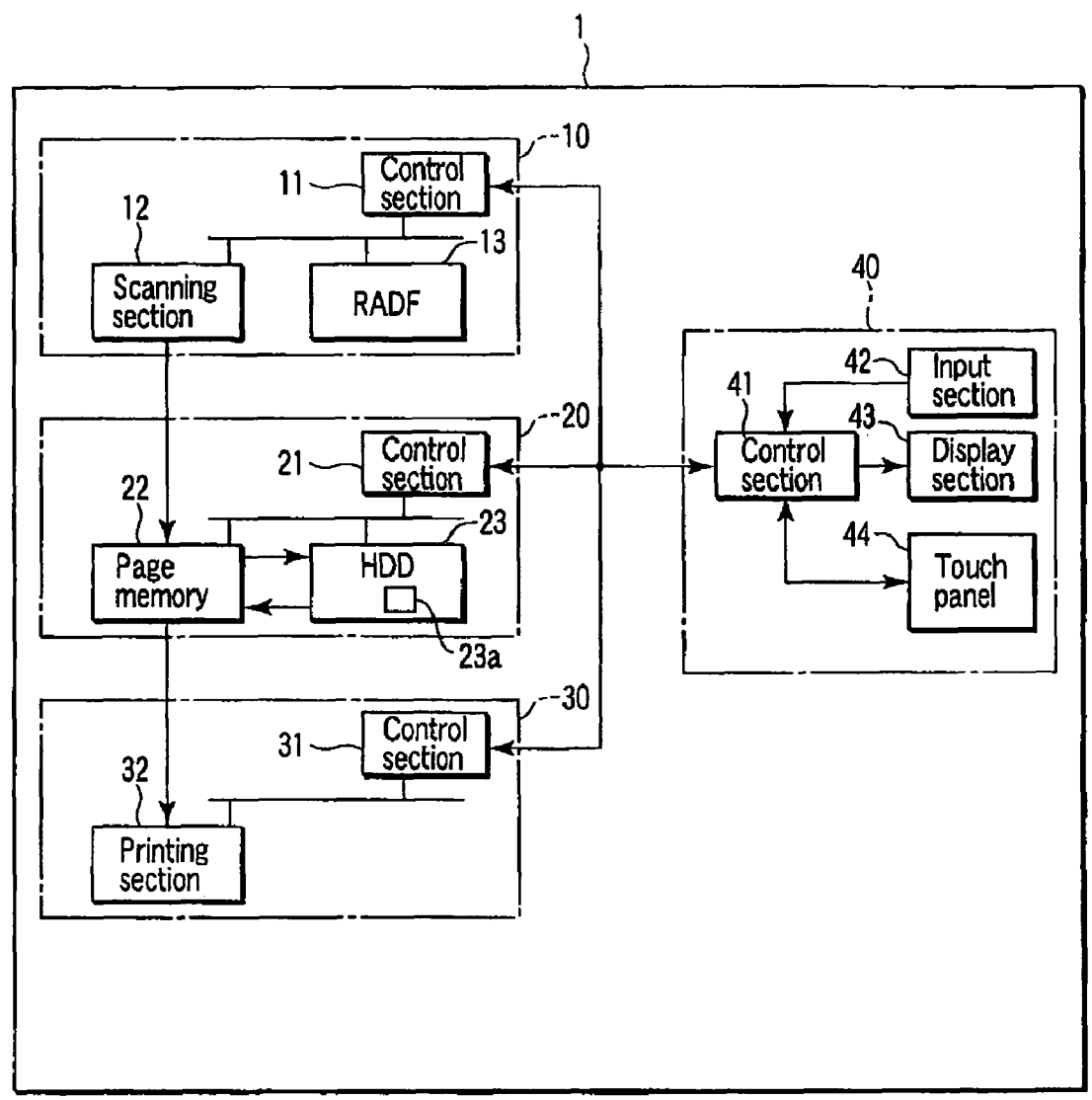
FIG. 1 is a block diagram showing a main structure of an image forming apparatus according to one embodiment of the present invention.

With reference to the drawing an explanation will be made below about one embodiment of the present embodiment.

FIG. 1 is a block diagram showing a main structure of an MFP 1 which provides an image forming apparatus of the present invention. As shown in FIG. 1, the MFP 1 has an image reading-out section 10, a system section 20, an image forming section 30 and a control panel section 40. The image reading-out section 10, system section 20, image forming section 30 and control panel 40 includes control sections 11, 21, 31 and 41, respectively. These control sections are connected to each other through a bus line.

A main structure of the image reading-out section 10 comprises the control section 11, a scanning section 12, an auto-document feeder (RADF) 13, etc. The control section 12 generally controls the whole image forming section 10, i.e., the scanning section 12, RADF 13, etc. The scanning section 12 reads out an image from the document and generates image data from the read-out image. The RADF 13 allows the set document sheet to be fed to the scanning section 12 for read-out. The image reading-out section outputs its read-out image data to the system section 20.

A main structure of the system section 20 comprises the control section 21, page memory 22, hard disk drive (HDD 23), etc. The control section 21 generally controls the whole system section 20, i.e., page memory 22, HDD 23, etc. The image data from the image reading-out section 10, after being once stored in the page memory 22, is stored in the HDD. The image data stored in the HDD 23 is read out onto the page memory 22 and output to the image forming section 30.

A main structure of the image forming structure 30 comprises a printing section 32, etc. The control section 31 generally controls an image section 30. The printing section 32 forms an image on a sheet based on the image data output from the system section 20. It is to be noted that the printing section 32 is so configured as to form a color image on a sheet with the use of toners of cyan, magenta, yellow and black.

A main structure of the control panel section 40 comprises the control section 41, input section 42, display section 43 and touch panel 44. The control section 41 generally controls the whole control panel section 40. The input section 42 has a start button for starting various kinds of processes, a clear button for clearing a received instruction content, numeral keys for inputting numerals 0 to 9 and various kinds of functional buttons, etc. The display section 43 is a lamp. It is lit when, for example, an error state occurs in an apparatus and informs the error state to the user. The touch panel 44 displays, for example, information items showing the states of operations and buttons necessary for the operations. The touch panel 44 receives a user's instruction by touching a corresponding displayed button.

Figure 2:
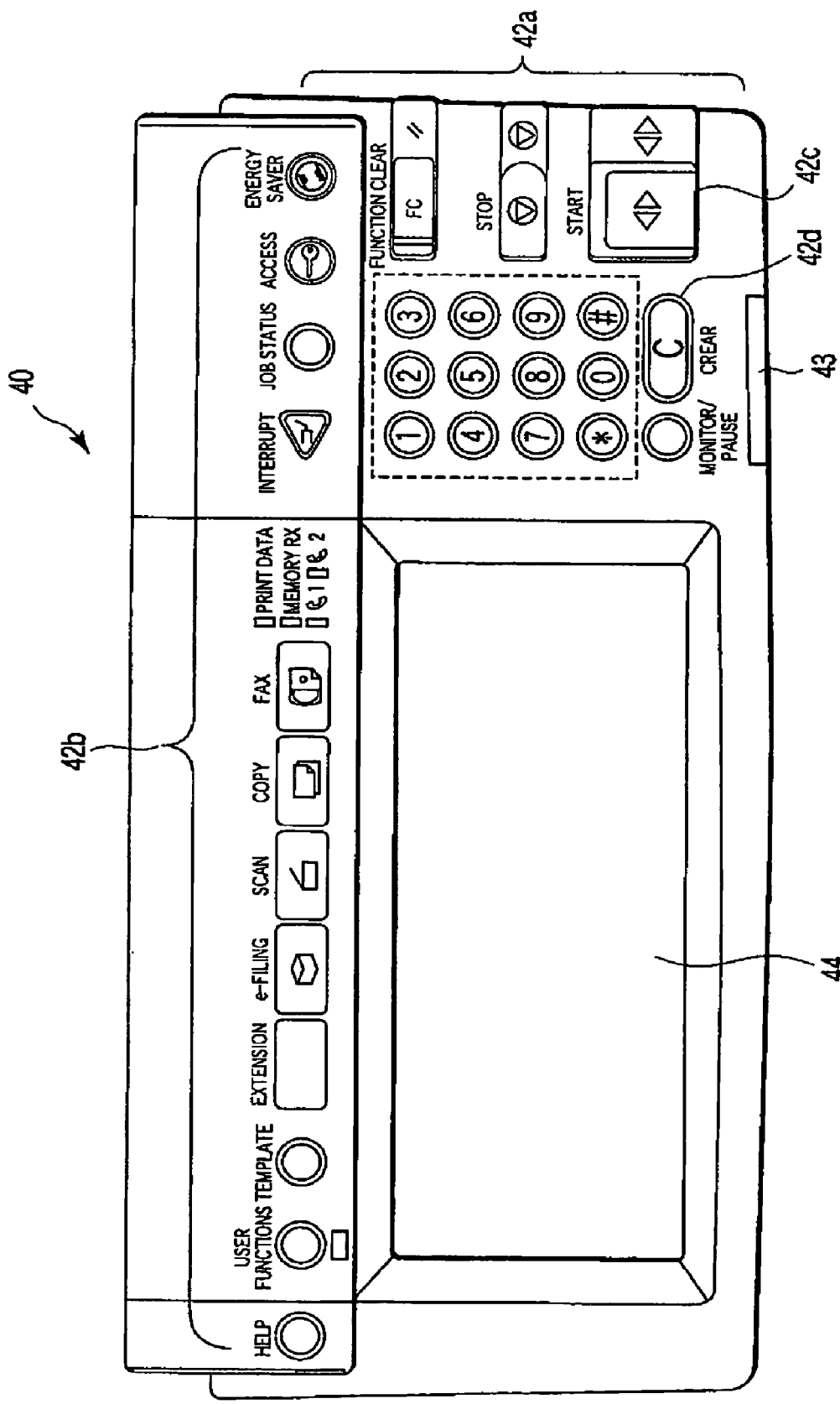
FIG. 2 is a view showing a control panel in the embodiment.
Figure 3:
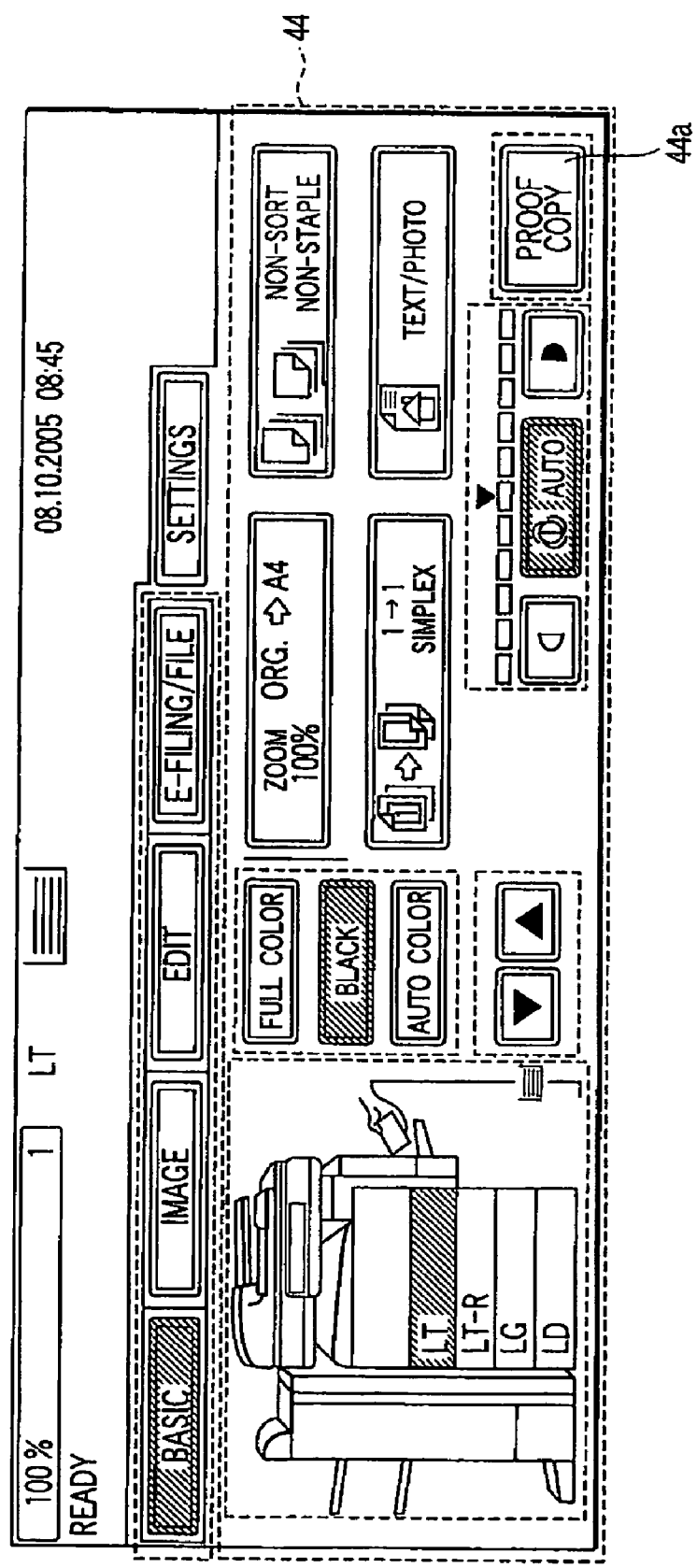
FIG. 3 is a view showing a practical display form of a touch panel in the present embodiment.
Figure 4:
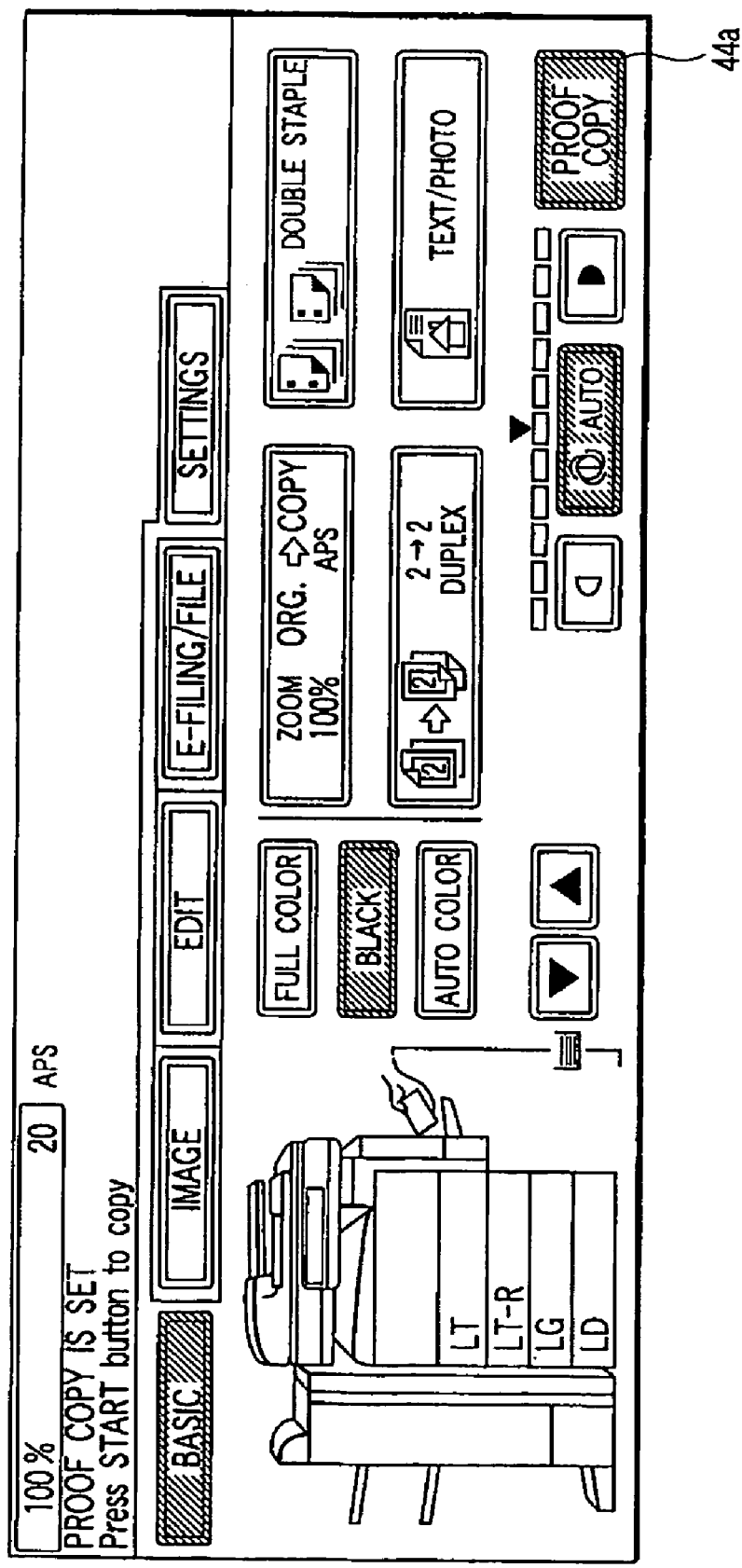
FIG. 4 is a view showing a practical display form of a touch panel when an input operation is made on a proof copy button in the present embodiment.

FIG. 2 is a view showing the control panel section 40. As shown in FIG. 2, the control panel section 40 includes an input section 42 having buttons 42*a* such as a start button 42*c*, clear button 42*d*, numeral buttons as well as various kinds of functional buttons; a display section 43 having an alarm lamp, etc; and a touch panel 44. FIG. 3 is a view showing a practical display form of the touch panel 44. As shown in FIG. 3, out of various kinds of buttons displayed on the touch panel 44, a proof copy button 44*a* is displayed. It is to be noted that those respective buttons on the touch panel 44 are so displayed as to define black characters normally on a white background. When, on the other hand, any button is touched by the user, then the button characters become white on a black background (that is, become a white/black inverted state) to inform the user that a corresponding input is accepted. FIG. 4 is a view showing a practical display form of the touch panel 44 with the proof copy button 44*a* touched by the user as an input to provide a white/black inverted display state.

FIG. 5 is a block diagram showing a main section of the control section in the system section 20. The control section comprises a CPU 211, a ROM 212 and RAM 213 and these are connected together through a bus line. The CPU 211 is a control section body and runs, for example, a control program stored in the ROM 212 and a control program, etc., in the HDD 23. In the ROM 212, a control program is stored which is run by the CPU 211. The RAM 213 includes work areas, etc., temporarily stored with information necessary to run the control program by the CPU 211.

Further, the HDD 23 has a memory section 23a for storing a control program for performing the proof copy mode on the MFP 1. It is to be noted that the HDD 23 stores other control programs and image data.

FIG. 6 is a view for explaining the information memory areas in the RAM 213. The RAM 213 includes a print setting memory area 213*a*, an input number-of-times memory area 213*b* and a set value memory area 213*c*. The print setting, such as the number of copies required at the formation of an image in the image forming section 30, is stored in the print setting memory area 213*a*. The input number-of-times memory area 213*b* is an area for storing the numbers of times an input is made on the proof copy button 44*a* in interrupt processing at a time of a proof copy mode. A set value showing the number of times proof copying can be made in interrupt processing at the time of a proof copy mode is stored in the set value memory area 213*c*. The term "proof copy" means that, based on the stored image data, only one copy is output in interrupt processing at the time of a proof copy mode. Where, for example, the user wants to change the print setting, the proof copy is made to check a print workmanship when printing is made.

In this embodiment, as a set value, "2" is set in the set value memory area 213*c*. Further, the proof copy mode processing as will be set out below is the processing by which the print setting can be made by the number of times less than the set value. By setting "2" as the set value, therefore, it is possible to make proof coping once in the interrupt processing at the time of a proof copy mode. In this connection it is to be noted that the set value memory area 213*c* can hold the set value under a backed-up power source (not shown). Although, in this embodiment, the proof coping has been explained as being able to be made only once in the interrupt processing at the time of a proof copy mode, it is possible to make proof copying a plurality of times by setting a numeral value of "3 or more" in the set value memory area 213*c*. The changing of this set value is done by the touch operation on the touch panel 44, for example, by an administer of the MFP 1.

In the MFP 1 thus structured, the scanning function, printer function, copying function, etc., can be performed by the user's operation on the input section 42 and touch panel 44 in the control panel section 40. Although the MFP 1 has a network function, facsimile function, etc., these have no direct relevance to the present invention and any structure of the network function and facsimile function is omitted from being explained and illustrated.

Figure 7:
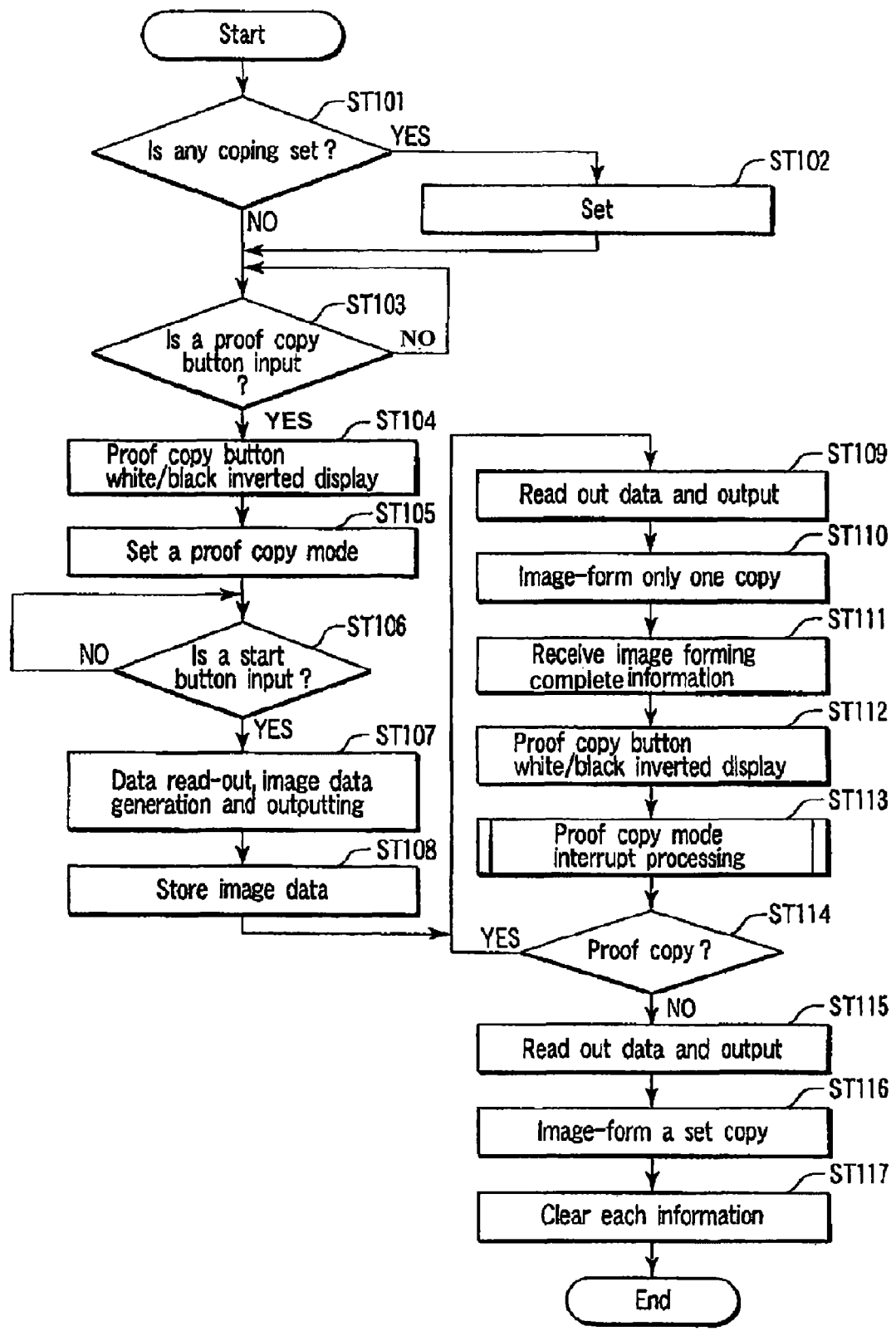
FIG. 7 is a flowchart showing proof copy mode processing in the present embodiment.

Further, with reference to FIG. 7 an explanation will be made below about the proof copy processing done on the MFP 1. FIG. 7 is a flowchart showing the processing in the proof copy mode.

First, the CPU 211 decides whether or not any copying is set based on an input from the touch panel 44 (ST 101). When the CPU 211 decides that copying is set (YES at step ST 101), it receives an input from the touch panel 44 and sets its copying (ST 102). This setting includes, for example, a copy mode, the number of copies, date/time addition, stapler-binding (where a finisher of the option is attached), and so on.

At a setting of copying (ST 102) or at a setting of copying in a default state without receiving any setting of copying (NO at step ST 101), the CPU 211 decides whether or not an input is done on the proof copy button 44*a* (ST 103). If the input is decided as being made on the proof copy button (YES at ST 103), the display of the proof copy button 44*a* is changed to invert a character color and background color in a white/black inverted way (ST 104) and a proof copy mode is set (ST 105).

The CPU 211 decides whether or not an input is made on the start button 42*c* (ST 106). If the CPU 211 decides an input as being made on the start button 42*c* (YES at step ST 106), it delivers an instruction to the control section 11 and allows an image from a document set at RADF 13 to be read out by the scanning section 12 and that image data to be generated (ST 107). In this connection it is to be noted that the generated image data is output to the system section 20.

When the image data is output to the system section 20, the CPU 211 allows the image data to be stored in the HDD 23 through the page memory 22 (ST 108). The CPU 211 allows the image data which is stored in the HDD 23 to be output to the image forming section 30 through the image memory 22 (ST 109). When the image data is output to the image forming section 30, the CPU 211 delivers an instruction to the control section 31 and allows one copy to be image-formed by the image forming section 30 based on image data and the print setting stored in the print setting memory area 213*a* (ST 110). When an image formation is complete, the CPU 211 allows the reception of image formation complete information representing the completion of the image formation from the control section 31 in the image forming section 30 (ST 111). Upon receipt of the image formation complete information, the CPU 211 allows the proof copy button 44*a* to be displayed in a white/black inverted fashion-ST 112. By doing so, the proof copy button 44*a* is set in a non-select state.

The CPU 211 performs interrupt processing at a proof copy time (ST 113). This interrupt processing is standby processing for receiving, from the user, an instruction to allow any remaining copy to be image-formed in a proof copy mode and it does not receive any job other than a high priority order interrupt job. The interrupt processing at the time of a proof copy mode will be later stated with reference to FIG. 8. When the interrupt processing at the time of a proof copy mode is ended, the CPU 211 decides whether or not the proof copying is set (ST 114). This decision is decided based on whether or not, for example, the proof copy button 44a is in a select state. If the CPU 211 decides the proof copying as being set (YES at ST 114), it again performs processing of ST 109 to ST 112. That is, the CPU allows the image forming section 30 to image-form one copy based on the print setting stored in the print setting memory area 213a and image data. After this, the CPU again performs interrupt processing at the time of a proof copy mode at step ST 113. If the CPU 211 decides the proof copying as not being set (NO at step ST 114), it allows the image data which is stored in the HDD 23 to be output to the image forming section 30 through the page memory 22 (ST 115). When the image data is output to the image forming section 30, the CPU 211 issues an instruction to the control section 31 to allow any remaining copy which is set in the image forming section 30 to be image-formed based on the print setting stored in the print setting memory area 213a and its image data (ST 116). The CPU 211 clears respective information stored in the print setting memory area 213a and input number-of-times storing area 213b in the RAM 213 (ST 117).

Figure 8:
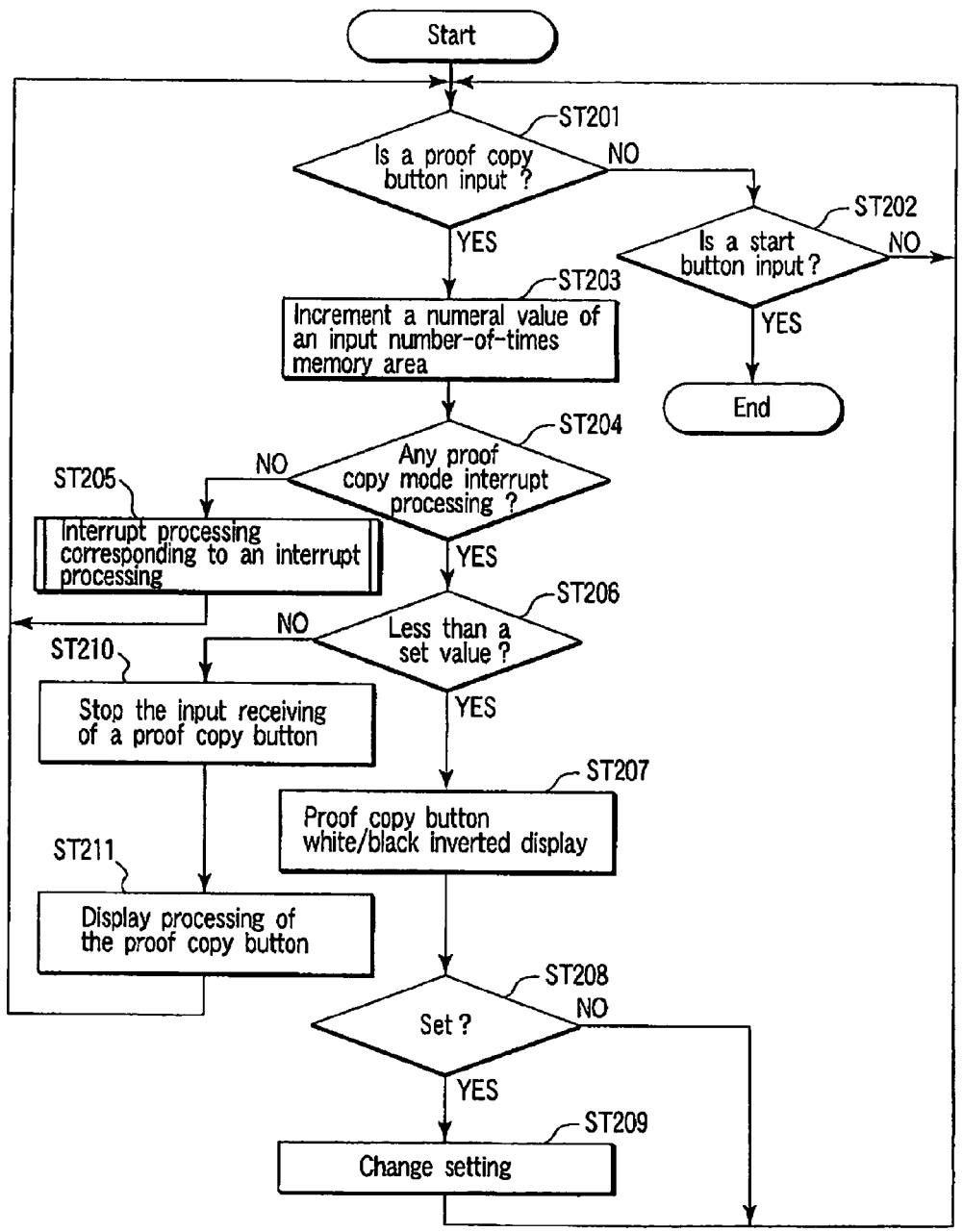
FIG. 8 is a flowchart showing interrupt processing at a time of the proof copy mode in the present embodiment.

An explanation will now be made below about the interrupt processing at the time of a proof copy mode. FIG. 8 is a flowchart showing the interrupt processing at the time of a proof copy mode.

First, the CPU 211 decides whether or not an input is made on the proof copy button 44a (ST 201) and whether or not an input is made on the start button 42c (ST 202). If an input is decided as being made on the start button 42c (YES at ST 201), the CPU 211 ends the proof copy interrupt processing. In this case, the decision of the ST 114 is further made. Since, in this case, the input is made on the start button 42c, the CPU makes a "NO" decision and processing of steps ST 115 to ST 117 is carried out. That is, the printing of any remaining copy is done.

While, on the other hand, the CPU 211 decides that an input is made on the proof copy button 44a (YES at ST 201), it increments a numeral value in the input number-of-times memory area 213b of the RAM 213 (ST 203). The CPU 211 also decides whether or not current interrupt processing is interrupt processing at the time of a proof copy mode (ST 204). This decision is made based on, for example, whether or not an image formation complete signal is received at step ST 111. That is, if the image formation complete signal is received, the CPU decides it is interrupt processing at the time of a proof copy mode. If, for example, any interrupt is involved in the image forming section 30 due to a jam error, no image formation complete signal is received. For this reason, this is decided as not being interrupt processing at the time of a proof copy mode. If the CPU 211 decides it as not being interrupt processing (NO at step 204), the CPU 211 performs the interrupt processing corresponding to the cause of the interruption (ST 205). When the interrupt processing is ended, the CPU 211 again decides whether or not an input is made on the proof copy button 44a (ST 201) and whether or not an input is made on the start button 42c (ST 202).

When the CPU 211 decides this as being interrupt processing at the time of a proof copy mode (YES at ST 204), the CPU 211 decides whether or not the numeral value stored in the input number-of-times memory area 213b is less than a set value stored in the set value memory area 213b (ST 206). If the CPU 211 decides this as being less than the set value (YES at ST 206), the CPU 211 displays the proof copy button 44a in a white/black inverted state (ST 207). And the CPU 211 decides whether or not the input made on the touch panel 44 involves the setting of printing (ST 208). If the CPU 211 decides this as involving the setting of printing (YES at ST 208), the setting of printing is changed (ST 209). The CPU 211 then again decides whether or not an input is made on the proof copy button 44a (ST 201) and whether or not an input is made on the start button 42c (ST 202). When an input is made on the start button 42c, the CPU 211 ends the interrupt processing at the time of a proof copy mode.

While, on the other hand, the CPU 211 decides this as being not less than a set value (NO at ST 206), the CPU 211 performs stop processing for stopping the receiving of the input on the proof copy button 44a (ST 210). The CPU 211 sends an instruction to the control section 41 of the control panel section 40. By doing so, the control section 41 of the control panel section 40 displays a proof copy button 44a on the touch panel 44 (ST 211). For example, even if an input is made on the proof copy button 44a by the user, the control section stops the proof copy button 44a from being displayed in a white/black inverted state, informing the user that no input operation is available. Instead of this, the proof copy button 44a may be displayed in a dimmed-out state, thus previously informing the user that an input operation is not available. In addition to this display, a message indicating "proof copy now unavailable" may also be displayed on the touch panel 44. In connection with the display of the proof copy button 44a it is possible to erase the proof copy button 44a from the touch panel 44. When the display of the proof copy button 44a is thus ended, the CPU 211 again decides whether or not an input is made on the proof copy button 44a (ST 201) and whether or not an input is made on the start button 42c (ST 202). As already set out above in connection with the step ST 211, an input cannot, in this case, be made on the proof copy button 44a. Therefore, it is necessary for the user to either start an image formation of a predetermined number of copies on the MFP 1 by an input operation on the start button 44a or restart proof copy mode processing from the outset by depressing the clear button 42d.

An explanation will now be made about the function when the user performs proof copying on the MFP 1.

The user sets a document on the RADF 13 and, after setting, for example, 10 copies to the MFP 1, an input operation is made on the proof copy buttons 44a. By the input operation of the proof copy buttons 44a, a character color and background color are changed in a character-in-background white/black state. By an input operation on the start button 42c, proof copying is started on the MFP 1.

The MFP 1 reads out an image from the set document and generates corresponding image data to allow it to be stored in the HDD 23. Based on the image data stored in the HDD 23, one copy is printed. After printing is made, the proof copy button 44a is again displayed in a white/black inverted state to bring the display back to the original state. The MFP 1 is now in an interrupted state in the proof copy mode.

The user checks a printed sheet for workmanship. If the user finds it satisfactory, he or she performs an input operation on the start button 42c and the remaining nine copies are printed. If, however, the user finds the copy inadequate, it will be necessary to change print settings, such as in the case of wanting staple binding. In this case, an operation is made on the touch panel 44 and print setting is changed for a staple binding and again an input operation is made on the proof copy button 44a. At the interruption time, this is a first input operation on the proof copy button 44a and accepted on the MFP 1. By this input operation, the proof copy button 44a is displayed in the white/black inverted state and an input operation is made on the start button. Then, with the changed print setting, one copy only is printed based on the image data stored in the HDD 23. That is, the printed medium is staple-bound. When the print is thus ended, the proof copy button 44*a* is again brought back to the original white/black inverted display state.

The user checks a newly printed copy for workmanship. There is the case where, even if printing is made by changing the print setting, it is sometimes not possible to obtain a printed copy meeting the user's demands. Here, the user alters the print settings. For example, an operation is made on the touch panel 44 to cancel the setting for the staple binding and a date/time print setting is carried out. For proof copying to be effected by the user, an input is made on the proof copy button 44*a*. Since this is a second input operation on the proof copy button 44*a* at a time of an interrupted proof copy mode on the MFP 1, the MFP 1 does not accept this input operation, that is, the proof copy button 44*a* is not changed to the white/black inverted display, thus informing the user that the proof copying is not available. That is, the user cannot make a second proof copying.

It is, therefore, necessary to either make a printing with a changed setting by making an input operation on the start button 42*c* or restart copying from the outset by making an input operation on the clear button. By doing so, the proof copy mode is once ended or cancelled. Therefore, it becomes possible to receive any other job, such as a print job which is transmitted from a computer connected under a network function.

Thus it is possible to continue the proof copying and hence to continue a proof copy mode and to prevent a situation in which any job other than an interrupted job is not accepted. That is, the MFP 1, even if having a proof copy function, allows anyone else to use it without having to wait.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the invention as defined by the appended claims and equivalents thereof.

What is claimed is:

1. An image forming apparatus comprising:
    an image reading section configured to read out an image from a document and output its image data;
    an image data memory section configured to store the image data which is output from the image reading section;
    an image forming section configured to form the image on a sheet based on the image data which is output from the image data memory section;
    a memory section configured to store a print setting including a setting of a number of print copies and a first value;
    a proof copy button configured to set a proof copy mode for proof copying, during which only one of the print copies is allowed to be image formed based on the print setting and the image data before an interrupt process is initiated during which image forming of remaining print copies is interrupted and additional proof copying is carried out;
    a control section configured to restrict the additional proof copying during the interrupt process if the number of times the additional proof copying has been carried out during the interrupt process is equal to or greater than the first value stored in the memory section;
    a control panel having a touch panel on which the proof copy button is formed; and
    a display control section configured to make the proof copy button unavailable to be selected when the control section restricts the additional proof copying.

2. An image forming apparatus according to claim 1, wherein the control section allows the additional proof copying during the interrupt process if the number of times the additional proof copying has been carried out during the interrupt process is less than the first value stored in the memory section.

3. An image forming apparatus according to claim 1, wherein, upon receipt of an input, the proof copy button allows a character color and background color to be inverted, informing that the additional proof copying can be performed, and the process to make the proof copy button unavailable to be selected comprises processing which does not allow the character color and background color of the proof copy button to be inverted.

4. An image forming apparatus according to claim 2, wherein the proof copy button, upon receipt of an input, allows a character color and background color to be inverted, informing that the additional proof copying can be performed, and the process to make the proof copy button unavailable to be selected comprises processing which does not allow the character color and background color of the proof copy button to be inverted.

5. An image forming apparatus comprising:
    image reading means for reading out an image from a document and outputting its image data;
    image data memory means for storing the image data which is output from the image reading means;
    image forming means for forming the image on a sheet based on the image data which is output from the image data memory means;
    memory means for storing a print setting including a setting of a number of print copies and a first value;
    a proof copy button configured to set a proof copy mode for proof copying, during which only one of the print copies is allowed to be image formed based on the print setting and the image data before an interrupt process is initiated during which image forming of remaining print copies is interrupted and additional proof copying is carried out;
    control means for restricting the additional proof copying during the interrupt process if the number of times the additional proof copying has been carried out during the interrupt process is equal to or greater than the first value stored in the memory means;
    a control panel having a touch panel on which the proof copy button is formed; and
    a display control means for making the proof copy button unavailable to be selected when the control means restricts the additional proof copying.

6. An image forming apparatus according to claim 5, wherein the control means allows the additional proof copying during the interrupt process if the number of times the additional proof copying has been carried out during the interrupt process is less than the first value stored in the memory means.

7. An image forming apparatus according to claim 5, wherein, upon receipt of an input, the proof copy button allows a character color and background color to be inverted, informing that the additional proof copying can be performed, and the process to make the proof copy button unavailable to be selected comprises processing which does not allow the character color and background color of the proof copy button to be inverted.

8. An image forming apparatus according to claim 6, wherein the proof copy button is provided on the touch panel and, upon receipt of an input, allows a character color and background color to be inverted, informing that the additional proof copying can be performed, and the process to make the proof copy button unavailable to be selected comprises processing which does not allow the character color and background color of the proof copy button to be inverted.

9. A method for restricting additional proof copying on an image forming apparatus having a control section configured to set a proof copy mode for proof copying during which only one copy is allowed to be image formed based on a print setting and image data and an interrupt process is initiated during which image forming of remaining copies is interrupted and additional proof copying is carried out, the method comprising:
   receiving an instruction for performing additional proof copying during the interrupt process when a proof copy button which is provided on a touch panel and gives instructions to carry out additional proof copying is pressed;
   storing a numeral value indicating the number of times the additional proof copying is restricted to; and
   restricting by the control section the performing of the additional proof copying if the number of times the additional proof copying is performed is equal to or greater than the numeral value indicating the number of times the additional copying is restricted to, by making the proof copy button unavailable to be selected.

10. A method according to claim 9, further comprising allowing by the control section the performing of the additional proof copying if the number of times the additional proof copying is performed is less than the numeral value indicating the number of times the additional copying is restricted.

11. A method according to claim 9, wherein, upon receipt of an input, the proof copy button allows a character color and background color to be inverted, informing that the additional proof copying can be performed, and the process to make the proof copy button unavailable to be selected comprises processing which does not allow the character color and background color of the proof copy button to be inverted by the control section.

12. A method according to claim 10, further comprising changing a display of a proof copy button on a touch panel for instructing the performing of said additional proof copying which, upon receipt of an input, allows a character color and background color to be inverted to inform that the additional proof copying can be performed, to a display which the control section stops the character color and background color in the proof copy button from being inverted to inform that the performing of the additional proof copying cannot be effected.

* * * * *